W. G. R. BRAEMER.
METHOD OF HUMIDIFYING AIR.
APPLICATION FILED JAN. 10, 1908.

905,143.

Patented Dec. 1, 1908.

2 SHEETS—SHEET 1.

Witnesses

Inventor
William G. R. Braemer
By
Attorney

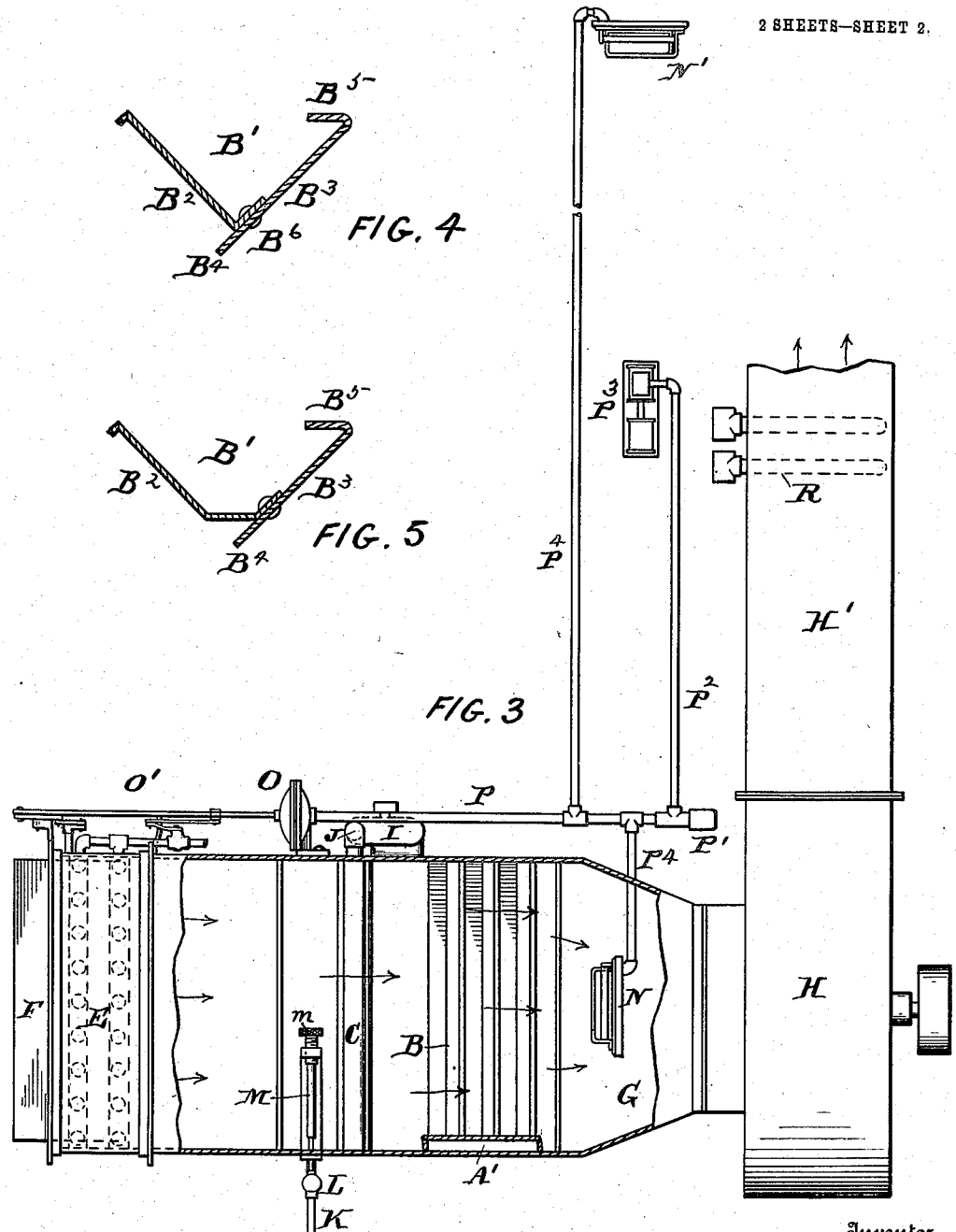

UNITED STATES PATENT OFFICE.

WILLIAM G. R. BRAEMER, OF BUFFALO, NEW YORK, ASSIGNOR TO WARREN WEBSTER & COMPANY, A CORPORATION OF NEW JERSEY.

METHOD OF HUMIDIFYING AIR.

No. 905,143.

Specification of Letters Patent.

Patented Dec. 1, 1908.

Application filed January 10, 1908. Serial No. 410,188.

*To all whom it may concern:*

Be it known that I, WILLIAM G. R. BRAEMER, a citizen of the United States, and a resident of the city of Buffalo, county of Erie, State of New York, have invented an Improvement in Methods of Humidifying Air, of which the following is a specification.

My invention has reference to methods of humidifying air, and consists of certain improvements, which are fully set forth in the following specification, and shown in the accompanying drawings, which form a part thereof.

The object of my invention is to provide a method for producing and maintaining a predetermined fixed absolute humidity to the air delivered to a building or a compartment therein.

My object is also to provide capacity for maintaining any desired relative humidity in the building or room to suit the requirements.

Incidentally to the above objects, I cause the air to be cleansed or purified.

In carrying my invention into practice, I first heat the fresh air to such a degree as to give it a predetermined normal temperature that, when treated to a water spray or vapor of a given and constant temperature, it will absorb the desired amount of moisture to give the absolute humidity required, and this humidified air may, if not of the desired relative humidity and temperature, be reheated to raise it to the required temperature and to lower its relative humidity to that necessary and desired for said temperature, and such conditions may be maintained by automatically varying the initial temperature given to the fresh air above or below the normal temperature to vary the humidity commensurately and inversely with the conditions occurring in the building or room being supplied with the air.

The invention may be commercially employed in apparatus comprising a chamber through which air is circulated by a blower and in which it is treated with moisture, combined with means for supplying a spray or vapor of water at a constant temperature to the air in its passage through the chamber, means for varying the temperature of the air before being treated to the spray or vapor of water, and automatic means under the control of the conditions of the air after being treated to the spray or vapor of water for varying the initial temperature of the air in accordance with the conditions of the air delivered to the building or room whereby the absolute humidity of the air may remain constant or substantially constant.

My invention will be better understood by reference to the drawings, in which:—

Figure 1:
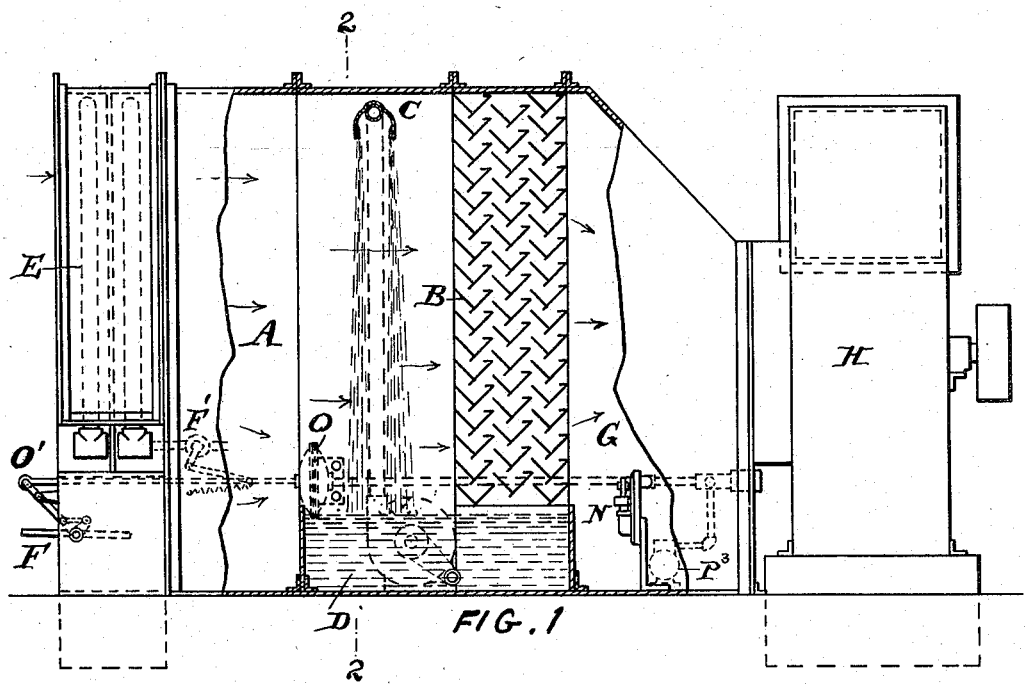
Figure 2:
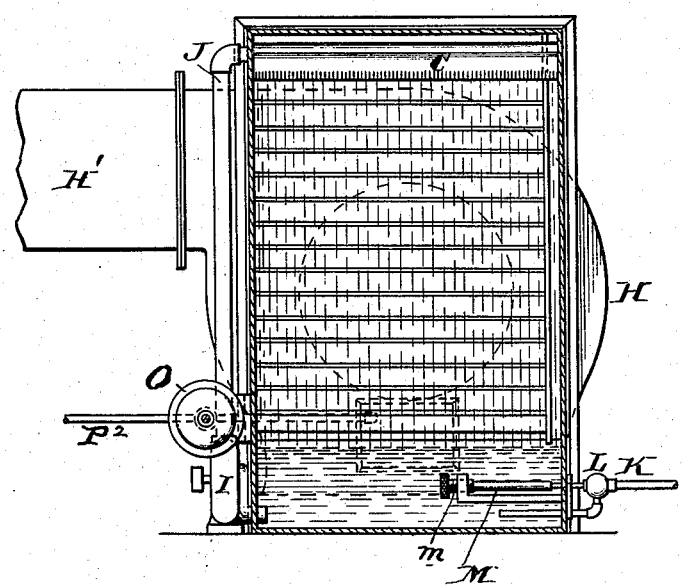

Figure 1 is a sectional side elevation of an air purifying apparatus embodying my invention; Fig. 2 is a cross section of the same on line 2—2 of Fig. 1; Fig. 3 is a sectional plan view of the same; Fig. 4 is a cross section of one of the eliminator bars; and Fig. 5 is a cross section of a modification of the eliminator bar shown in Fig. 4.

A is the air chamber, B is the eliminator therein, C is the water spraying pipe, and H is the blower for causing the air to be drawn through the chamber and discharged into the flue H' leading to the building or room to be supplied with the humidified air. The incoming fresh air first passes through the tempering coils E which imparts to it the desired heat, and where the supply of steam to the said coils is not variable under regulation, the temperature of the air which passes through the chamber A may be regulated by allowing more or less fresh air to pass through a by-pass under the regulation of a valve F as more fully shown in Fig. 1. By means of the coils E and the by-pass valve F, a mixture of hot air and cool air may be provided in the chamber A which will give the requisite amount of temperature necessary to enable the air to take up the desired quantity of moisture when it passes through the water sprays from the spraying pipe C. After the heated air has been humidified to such a degree as to contain the predetermined absolute humidity, it is passed through the eliminator B wherein the excess of moisture is removed and returned to the tank D below the spraying pipe and the eliminator. The water in the tank D is maintained at a constant temperature in any suitable manner. The particular means for maintaining this constant temperature is shown, for example, in this application as a steam nozzle K adapted to discharge directly into the water, a valve L to control the flow of steam, and a thermostatic rod M which under the influence of the heat of the water opens or closes the steam valve to maintain the temperature of the water at that temperature which has been predetermined upon. The thermostatic regulating device M may be so arranged that it may be adjusted by the screw m to vary the time of opening and closing of the valve, and consequently insure the temperature of the water in the tank being maintained constant at higher or lower temperature according to the requirements of the apparatus. Any other suitable thermostatic regulator may be employed to insure the temperature of the water spray with which the air is treated remaining constant. The water from the tank D is circulated through the spraying pipe C by means of a pump I and pipe J leading from the pump to the spraying pipe, as more fully shown in Fig. 2.

R is a reheating device, and is designed to raise the temperature of the humidified air to that which is required for the building or compartment therein to which the air is supplied. This reheating device may be of any of the well known characters and, for example, such as shown by the tempering coils E combined with the valve and by-pass. Ordinarily, a thermostatic device is employed with this reheating device for the purpose of maintaining the temperature of the air delivered to the room constant. These devices are not shown, as they form no special part of the present invention.

O is a motor of any suitable construction, that shown being of the diaphragm variety, and this motor by means of connections O' may operate either or both the valve F to the by-pass to open or close it and the steam valve F' for the tempering coils E, the object being to automatically control the temperature of the air which may be contained in the chamber A before reaching the water spray. This motor O is operated by compressed air which passes from a compressor P³ through pipes P² P and a pressure reducing device P' of any suitable character arranged at the junction of the pipes P² P.

N is a humidistat of any suitable construction and may be arranged in the part G of the chamber A intermediate of the eliminator B and the blower H and this humidistat may have an air pipe connection P⁴ with the pipe P.

The general principle upon which the humidistat operates is immaterial to my invention, but it may be stated that, in the type shown, a vent in the pipe P⁴ is controlled by a mechanism dependent upon the coöperative operation of a wet expansible body and a dry expansible body. If the humidity becomes too low, then the vent in the humidistat is closed, and this action allows the pressure of the air in the pipe P and motor to increase with the result that the motor will close the valve F and thereby insure the air entering the chamber A being of a higher temperature, in which case it will absorb more moisture from the water spray, and consequently have a greater absolute humidity. The operation of the humidistat and motor is such that they will operate the valves F or F' or both of them (according as to whether either or both are employed) to vary the temperature of the air commensurately with the requirements so that the humidity of the air which is delivered to the room by the blower H shall be constant or substantially constant, both as to the absolute and relative humidities, and moreover that the said relative humidity may be constant with a definite temperature of the air in the room.

In place of or in conjunction with the humidistat N in the part G of the chamber A, I may employ a humidistat N' in the room or compartment to be supplied with air, and this may be connected with the pipe P by a pipe P⁴. In fact, the humidistats may be located anywhere, so long as they are affected by the air which has been treated to the humidifying apparatus. These humidistats are adjusted to operate for a given absolute or relative humidity. For example, the humidistat N might be adjusted with respect to the absolute humidity required, whereas the humidistat N' may be adjusted with respect to the relative humidity.

The eliminator B may be of any suitable construction, but the form illustrated in the drawing has been found excellently adapted for the purpose. This consists of three or more series of trough-shaped bars B', each series comprising bars arranged one above the other with spaces between them and the successive series being staggered with relation to the next series adjacent, as will be understood by reference to Fig. 1. Each trough-shaped bar forms in its upper part a gutter in which the water may collect and run longitudinally and be discharged at one end into a compartment A' and by which it may be conveyed down into the tank D. These bars may, if desired, have slight obliquity, so as to induce the water to run to one end. The bars may be made as indicated in Figs. 4 and 5.

Referring to Fig. 4, the front plate B² is riveted at B⁶ to the rear plate B³, which latter has its lower edge extended beyond the plate B² and its upper edge bent inward as at B⁵. The plates B² and B³ are arranged obliquely to each other and the obliquity of these plates is in opposite directions so as to form substantially a V-shape cross section with obstructing shouldered portions B⁴ and B⁵, which aside from giving strength may act to catch water and dirt.

In the construction shown in Fig. 5, the general arrangement of the parts is substantially similar to that of Fig. 4, except that in this case the plate B is not so deep and the lower edge of the plate B is bent backward so as to form a channel or groove between the shoulder B⁴ and the bent portion of the plate P². In this case, the lower free edge of the plate B³ need not extend beyond the plane of the inclined portion of the plate B².

In the operation of the machine, the moist air strikes the plates B² and is deflected downward and around the portions B⁴, the latter catching any excessive moisture which may be driven downward along the surface of the plates B² or carried in suspension by the air which strikes the shouldered portions B⁴. The water collected by these shouldered portions together with any dirt, such as soot, contained in the water globules, is caused to flow downward into the trough-shaped bar immediately below and by it conveyed laterally out of the air circulation. The air which passes below the shouldered portions B⁴ strikes the plates B³ of the trough-shaped bars immediately below and is guided upwardly against the shouldered portions B⁵ which remove any additional air or dirt, the same running backward into the trough portion of the bars, and thence laterally out of circulation of the air.

Having now described the general construction of the apparatus and the function of the various parts, I will now point out the manner in which the apparatus may be used for producing definite results which conform to the requirements specified in the first part of this specification. Assuming that the air which is to be supplied to the room in the building is required to be at 70° Fahr. and 55 per cent, relative humidity, the following operation of the machine would produce this result. The air entering the chamber A would by means of the tempering coils E, supplemented by the by-pass valve F be brought to approximately a normal temperature of 56° Fahr., and at this temperature it is brought into contact with water spray or vapor which by test will give to the humidified air a temperature of approximately 55° Fahr. when leaving the eliminator B and containing 4½ grains of moisture per cubic foot. This will give such an absolute humidity to the air at 55° temperature which, when said air is transferred by the blower H through the reheating device R, may be brought to a temperature of 70° Fahr. with a relative humidity of 55. Having determined this condition by experiment, the operation of the apparatus may be maintained so as to continue to supply air into the room at 70° Fahr. and a humidity of 55 by means of the operation of the humidistats N or N' in connection with the temperature regulating devices for the air preliminary to the treatment by the water spray or vapor. As before pointed out, should the humidity in the room fall below the normal, the humidistat N' will instantly put the valves F or F' or both of them into operation to increase the temperature of the air to be treated with the waste spray or vapor above the predetermined normal temperature to enable it to reach a higher degree of humidity before being delivered to the blower, and in this way raising the humidity of the room until the proper humidity is again established, in which case the operation of the humidistat once more reduces the temperature of the air in the chamber A, bringing it to the predetermined normal condition. The same mode of regulation will take place under the control of the humidistat N, it only being necessary in this case to so adjust the humidistat that it adapts itself to the conditions of absolute humidity in the chamber G as distinguished from the relative humidity in the room containing the humidistat N'.

The objection to using the automatic control of the steam to the coils E is that the change of temperature in the coils E is slow, and consequently in the preferred form of apparatus the operation of a by-pass valve F is more preferable. While both of these regulating valves F F' may be employed, it is evident that either may be dispensed with by properly proportioning the apparatus, but in practice we prefer to produce the regulation of the temperature of the inflowing air by means of the by-pass valve F. In some cases heated air of definite and constant temperature from other sources may be available and in such instances, and where the relative humidity need not be very accurately maintained, the desired results may be secured by passing the said heated air through the spray of water of constant temperature, eliminating the excess of moisture and subsequently raising the temperature to lower the humidity.

While I have shown suitable apparatus in which to carry out my improved method, the invention may be employed with any other form of apparatus adapted for the purpose.

In this application I make no claim to the apparatus herein shown and described as the same forms subject matter of a divisional application Serial Number 443,050 and filed July 11th 1908.

Having now described my invention, what I claim as new, and desire to secure by Letters Patent, is:—

1. The herein described method of treating air whereby the air delivered to the room may be maintained at a definite humidity and temperature, which consists in normally supplying heated air at a predetermined temperature to aqueous spray or vapor of a constant temperature thereby giving to the air an absolute humidity, then raising the temperature of the humidified air to approximately the temperature required in the room and thereby lowering the relative humidity thereof to that desired, and maintaining the said condition of relative humidity by varying the temperature of the air relatively to its normal temperature before being treated by the aqueous spray or vapor for the purpose of varying the absolute humidity of the air before it is raised to the temperature required in the room.

2. The herein described method of treating air whereby the air delivered to the room may be maintained at a definite humidity and temperature, which consists in normally supplying heated air at a predetermined temperature to aqueous spray or vapor of a constant temperature and removing the excess of moisture from the air whereby the air contains only the absolute humidity required per cubic foot, mechanically propelling said humidified air toward the room in which it is to be utilized and simultaneously therewith raising the temperature of the humidified air to approximately the temperature required in the room and thereby lowering the relative humidity thereof to that desired, and maintaining the said condition of relative humidity by varying the temperature of the air relatively to its normal temperature before being treated by the aqueous spray or vapor for the purpose of varying the absolute humidity of the air before it is raised to the temperature required in the room.

3. The herein described method of treating air whereby the air delivered to the room may be maintained at a definite humidity and temperature, which consists in normally supplying heated air at a predetermined temperature to aqueous spray or vapor of a constant temperature thereby giving to the air an absolute humidity, then raising the temperature of the humidified air to approximately the temperature required in the room and thereby lowering the relative humidity thereof to that desired, and maintaining the said condition of relative humidity by varying the temperature of the air relatively to its normal temperature before being treated by the aqueous spray or vapor for the purpose of varying the absolute humidity of the air before it is raised to the temperature required in the room by regulating the temperature of the incoming air before it is treated to the aqueous spray or vapor to vary the absolute humidity of the air before being delivered to the room and controlling the regulation of the temperature of the incoming air by means of the condition of the air after being humidified.

4. The herein described method of treating air whereby the air delivered to the room may be maintained at a definite humidity and temperature, which consists in normally supplying heated air at a predetermined temperature to aqueous spray or vapor of a constant temperature thereby giving to the air an absolute humidity, then raising the temperature of the humidified air to approximately the temperature required in the room and thereby lowering the relative humidity thereof to that desired, and maintaining the said condition of relative humidity by varying the temperature of the air with respect to its predetermined normal temperature before being treated by the aqueous spray or vapor for the purpose of varying the absolute humidity of the air, and controlling the variations of the temperature of the said air delivered to the aqueous spray or vapor by means dependent upon the extent of the absolute humidity of the air after treatment to the aqueous spray or vapor.

5. The herein described method of treating air whereby it may be delivered to the room at a definite humidity and temperature, consisting of heating fresh air, passing the heated air through a spray or vapor of hot water, maintaining the temperature of the heated water substantially constant, removing the excess of moisture from the humidified air, reheating the air to raise it to the desired degree of temperature before delivery to the room, and automatically regulating the temperature of the fresh air inversely with the change of condition of the humidity of the air after being humidified, whereby the air in the room may be maintained under a substantially constant condition as to temperature and relative humidity.

6. The herein described method of treating air whereby it may be delivered to the room in a humidified condition, which consists in passing heated air through a spray or vapor of heated water, maintaining the temperature of the heated water substantially constant, removing the excess of moisture from the humidified air, and reheating the air to raise it to the desired degree of temperature to lower its relative humidity before delivery to the room.

7. The herein described method of treating air whereby it may be delivered to the room in a humidified condition, which consists in passing heated air through a spray or vapor of water, maintaining the temperature of the water substantially constant, removing the excess of moisture from the humidified air, and re-heating the air to raise it to the desired degree of temperature to lower its relative humidity before delivering to the room.

In testimony of which invention, I have hereunto set my hand.

WM. G. R. BRAEMER.

Witnesses:
R. M. HUNTER,
R. M. KELLY.